W. P. Clark,
Faucet.
No. 96,394.    Patented Nov. 2, 1869.
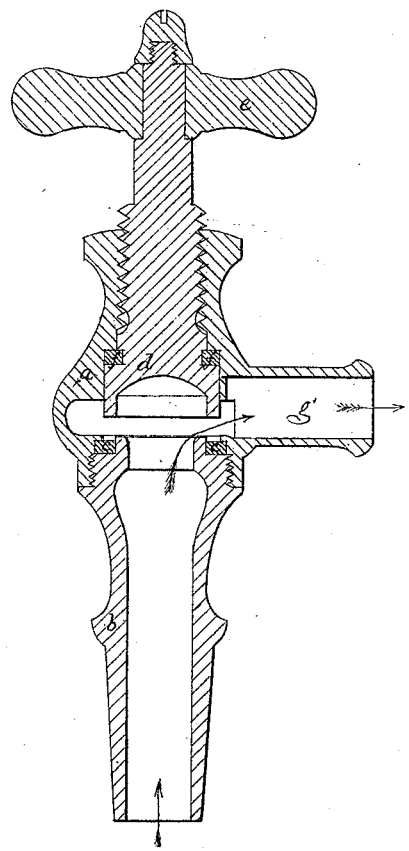
William P. Clark.
Witnesses
Francis Gowen,
S. B. Kidder.

United States Patent Office.

WILLIAM P. CLARK, OF MEDFORD, MASSACHUSETTS.

Letters Patent No. 96,394, dated November 2, 1869.

IMPROVEMENT IN FAUCETS.

The Schedule referred to in these Letters Patent and making part of the same.

*To all whom it may concern:*

Be it known that I, WILLIAM P. CLARK, of Medford, in the county of Middlesex, and State of Massachusetts, have invented Improvements in Faucets; and I do hereby declare that the following, taken in connection with the drawings, which accompany and form part of this specification, is a description of my invention, sufficient to enable those skilled in the art to practise it.

This invention relates to certain improvements in the details of construction and arrangement of water-cocks or faucets, by which the making of the same is facilitated, a tight closing of the fluid-passage is secured, and leakage is prevented around the stem, by which the valve of the cock or faucet is actuated.

My invention is clearly illustrated in the drawing, which is a longitudinal central section, taken through a faucet, embodying my invention.

The body of the faucet is made in two parts, $a$ and $b$, united by nut-threads in the former and screw-threads on the latter, as clearly shown.

The outer end of the part $b$ is to be entered into a barrel, or other vessel, or is to be joined to a pipe conveying fluid, as may be required.

The inner end terminates in a ring, projecting from a surface on which rests a ring, $c$, which is preferably made of lead, or other suitable soft metal, if the fluid to be drawn is hot, or of leather, if the fluid to be drawn is cold.

This ring $c$ serves the double purpose of a packing for the joint, between the parts $a$ and $b$, and of a seat for the valve $d$, and is confined from spreading laterally by the ring on the end of part $b$, and by being encompassed, at its periphery, by the part $a$, which also projects over the flat surface of ring $c$, against which the valve $d$ shuts, so as to prevent the ring $c$ from being pulled from its place by adhesion of the valve thereto.

It will be seen, that by making the valve-body in parts, substantially as shown, the ring $c$ can be easily and quickly changed for another when worn, so that the faucet can be kept, with ease, and very slight expense, in good working-order.

The valve $d$ is made as a cylinder, having one end open and the other closed, the valve-stem being made integral with the closed end, and having thereon screw-threads, fitted in nut-threads made in the outer end of part $a$, as shown, the valve being inserted in part $a$ before parts $a$ and $b$ are coupled together, and before the handle $e$ is attached to the valve-stem.

Within the part $a$, a socket is bored, of the diameter of valve $d$, so as to leave a shoulder, against which the upper part of the valve may abut, when drawn fully back, by turning the valve-stem.

To prevent leakage past the screw and nut-threads which control the valve, a groove is made at the juncture of the valve and its stem, into which a cut-ring, $f$, is placed, which ring is preferably of lead, or other suitable soft metal, if the faucet is used to draw hot fluids, or of leather, if used to draw cold fluids.

It will be seen, that when the valve is drawn fully away from its seat, the ring $f$ will be pinched between the shoulder formed on the valve and the shoulder formed in part $a$ of the faucet-body, so as to prevent leakage of fluid past said ring into and through the joint around the threads on the valve-spindle.

Pressure exerted by the screw on the valve-spindle on the ring $f$, and tending to thin and expand the ring, only causes the periphery of the ring to fill closely the cylinder and socket made in part $a$, to receive valve $d$.

The ring $f$, being formed to the size required, is cut open on one side, and is then spread out so as to embrace the valve-spindle, and is then bent back to its original form, filling the place prepared for it.

The course of the fluid through the faucet is clearly indicated by the arrows on the drawing, as entering the part $b$, and flowing out from part $a$ through the elongated outlet $g$.

I claim the faucet, as made, with its body in two parts, united by screw-threads, packed at the joint by the ring $c$, which forms the valve-seat, and is confined, as described, from spreading and from removal, by the action thereon of the valve, and which can be moved, and another substituted, by dismemberment of the body of the faucet.

Also, a faucet having a packing-ring, arranged, as described, with reference to the valve and valve-spindle, so as to be pinched between a shoulder on the valve and a shoulder on the faucet-body, to prevent leakage around the valve-stem when the valve is drawn off from its seat.

WILLIAM P. CLARK.

Witnesses:
FRANCIS GOULD,
S. B. KIDDER.